United States Patent
Bastiyali

(10) Patent No.: US 10,440,633 B1
(45) Date of Patent: Oct. 8, 2019

(54) SMART SAFE CONSOLE SYSTEM AND METHOD

(71) Applicant: Tarkan Bastiyali, New York, NY (US)

(72) Inventor: Tarkan Bastiyali, New York, NY (US)

( * ) Notice: Subject to any disclaimer, the term of this patent is extended or adjusted under 35 U.S.C. 154(b) by 0 days.

(21) Appl. No.: 16/277,990

(22) Filed: Feb. 15, 2019

(51) Int. Cl.
| | |
|---|---|
| *H04W 48/04* | (2009.01) |
| *B60R 11/02* | (2006.01) |
| *H04M 1/04* | (2006.01) |
| *B60R 11/00* | (2006.01) |
| *H04W 4/021* | (2018.01) |
| *G06Q 50/26* | (2012.01) |

(52) U.S. Cl.
CPC ......... *H04W 48/04* (2013.01); *B60R 11/0241* (2013.01); *B60R 11/0264* (2013.01); *B60R 2011/0075* (2013.01); *G06Q 50/265* (2013.01); *H04M 1/04* (2013.01); *H04W 4/021* (2013.01)

(58) Field of Classification Search
CPC .. H04W 48/04; H04W 4/021; B60R 11/0264; B60R 2011/0075; B60R 11/02; G06Q 50/265; H04M 1/04
See application file for complete search history.

(56) References Cited

U.S. PATENT DOCUMENTS

| | | | |
|---|---|---|---|
| 8,412,123 B2* | 4/2013 | Foster ................... | H04K 3/415 455/134 |
| 8,971,927 B2 | 3/2015 | Zhou et al. | |
| 9,161,208 B2 | 10/2015 | Inselberg | |
| 9,179,297 B2 | 11/2015 | Osann, Jr. | |
| 9,783,124 B2* | 10/2017 | Catlin ................ | B60R 11/0241 |
| 9,900,417 B1* | 2/2018 | Ruiz .................... | H04M 1/667 |
| 10,011,240 B1* | 7/2018 | Ranganathan ........... | B60N 3/10 |
| 10,169,933 B1* | 1/2019 | Harrison ................ | H04W 4/02 |
| 2001/0050614 A1 | 12/2001 | Yang | |
| 2007/0072616 A1 | 3/2007 | Irani | |
| 2009/0002147 A1 | 1/2009 | Bloebaum et al. | |
| 2011/0183601 A1 | 7/2011 | Hannon | |
| 2011/0290903 A1* | 12/2011 | Nagano .................... | A61L 9/12 239/34 |
| 2012/0214408 A1* | 8/2012 | Chronister ............ | H04W 12/06 455/26.1 |
| 2014/0100740 A1* | 4/2014 | Chutorash .......... | G01C 21/3661 701/36 |
| 2014/0264075 A1* | 9/2014 | LaPorte .................... | A61L 2/00 250/455.11 |
| 2014/0287709 A1* | 9/2014 | Iwade .................... | B60R 11/02 455/345 |
| 2016/0050309 A1 | 2/2016 | Gooberman | |
| 2016/0074545 A1* | 3/2016 | Kim ......................... | A61L 2/10 250/455.11 |
| 2016/0090047 A1* | 3/2016 | Huebner .................. | B60R 7/04 296/24.34 |
| 2017/0064056 A1* | 3/2017 | Uhlig ..................... | H04M 1/04 |

(Continued)

*Primary Examiner* — Khawar Iqbal
(74) *Attorney, Agent, or Firm* — Integrity Patent Group, PLC; Charles E. Runyan

(57) ABSTRACT

A smart safe console system; the smart safe console system includes a smart safe console assembly having a smart safe body suitable to house at least one electronic device and an engager-button configured for controlling input and output communications to and from the electronic device when a vehicle hosting the smart safe console system is in use. The smart safe console system is useful for improving vehicle safety in relation to the use of electronic devices.

4 Claims, 5 Drawing Sheets

(56) References Cited

U.S. PATENT DOCUMENTS

| | | | |
|---|---|---|---|
| 2018/0178652 A1* | 6/2018 | Monroe | G06F 3/1423 |
| 2018/0189800 A1* | 7/2018 | Harb | G06F 16/60 |
| 2019/0082378 A1* | 3/2019 | Dziurda | H04W 48/04 |

* cited by examiner

SMART SAFE CONSOLE SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of vehicle safety of existing art and more specifically relates to containment systems for electronic devices.

RELATED ART

Electronic devices like phones, tablets, smart glasses, and the like are becoming increasingly common in modern times. Such devices can be used for a variety of tasks including messaging, phone conversations, social media, navigation, photography, etc. With so many features offered on electronic devices, many people struggle to stop using the device during necessary times such as operating a vehicle. Many vehicle accidents are a result from distractions caused by electronic devices which is dangerous for public road safety.

Prior attempts to solve this problem include inhibiting all features and communications to and from the electronic device. However, the electronic devices offer a variety of resources that can be useful to a user or operator. Further, family members or friends can become worried when a message or phone call is not returned. Therefore, a suitable solution is required.

U.S. Pat. No. 8,412,123 to Virginia E. Foster relates to a radio opaque container for communication devices upon a vehicle. The described radio opaque container for communication devices upon a vehicle which has a bottom joined to four walls, a pivoting lid sealing upon the walls, a connector from the container to a vehicle, a locking mechanism keeping the lid closed, and circuitry between the locking mechanism and the vehicle that engages the locking mechanism only when the vehicle's electrical system is on. In an emergency, the contents within the container remain available to a vehicle operator but the container opens only when vehicle's electrical power has been turned off. The container forms at least one faraday cage around the contents and prevents equipment placed therein from activating and distracting a vehicle operator. In an alternate embodiment, the container includes a shelf therein.

SUMMARY OF THE INVENTION

In view of the foregoing disadvantages inherent in the known vehicle safety art, the present disclosure provides a novel smart safe console system and method. The general purpose of the present disclosure, which will be described subsequently in greater detail, is to provide a smart safe console system to improve vehicle safety in relation to the use of electronic devices.

A smart safe console system is disclosed herein. The smart safe console system includes a smart safe console assembly including a smart safe body suitable to house at least one electronic device. The electronic device may be able to be isolated from hand-held use by the smart safe body. The smart safe console assembly further includes an engager-button configured for controlling input and output communications to and from the electronic device when a vehicle hosting the smart safe console system is in use. The smart safe console assembly may be in communication with a provider and with the vehicle and may be configured to control use of the electronic device in relation to manipulation of the vehicle.

According to another embodiment, a method of using the smart safe console system is also disclosed herein. The method includes providing the smart safe console assembly including a smart safe body suitable to house at least one electronic device, and an engager-button configured for controlling input and output communications to and from the electronic device when a vehicle hosting the smart safe console system is in use. The smart safe body further includes a left-wing and a right-wing configured to move between an opened-state and a closed-state, and an interior-housing defined by one or more walls, the left-wing, and the right-wing. The smart safe console assembly may be in communication with a provider and with the vehicle and may be configured to control use of the electronic device in relation to manipulation of the vehicle. The method further includes registering the electronic device with a software application in communication with the smart safe assembly, inserting the electronic device into the smart safe body, connecting the electronic device to a charging unit equipped in the interior-housing, sensing the electronic device is connected to the charging unit via at least one operation sensor and registered with the software application, closing the left-wing and the right-wing, sensing the left-wing and the right-wing are in the closed-state via the at least one operation sensor, and manipulating the vehicle.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a smart safe console system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to containment systems for electronic devices and more particularly to a smart safe console system and method as used to improve vehicle safety while utilizing features on electronic devices.

Generally, the present invention includes a console which may be compatible with a variety of electronic devices such as smart phones, smart watches (iWatches), and smart glasses. The system may be installed in the area between an operator and a passenger, typically called the 'middle console', in any vehicle such as a train, boat, truck, or car. With the electronic devices locked away in the present invention, the operator can manipulate the vehicle with their full attention and any passengers do not have to worry if the operator is texting on the electronic device, on a social media site, or otherwise distracted.

Referring now more specifically to the drawings by numerals of reference, there is shown in FIGS. 1-4, various views of a smart safe console system 100.

Figure 1:
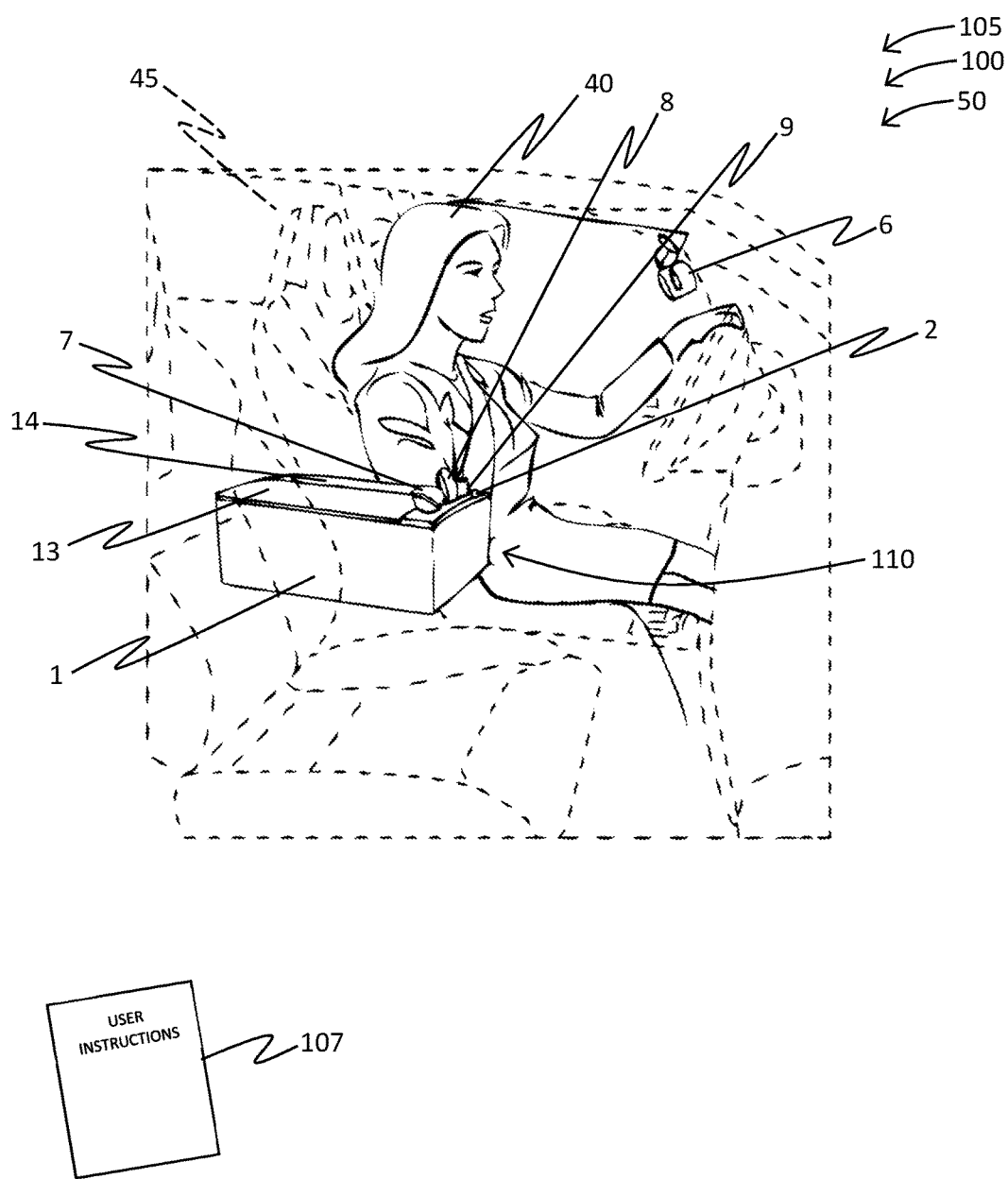
FIG. 1 is a perspective view of the smart safe console system during an 'in-use' condition, according to an embodiment of the disclosure.

FIG. 1 shows smart safe console system 100 during an 'in-use' condition 50, according to an embodiment of the present disclosure. Here, the smart safe console system 100 may be beneficial for use by an operator 40 to improve vehicle safety in relation to the use of electronic devices 21. As illustrated, the smart safe console system 100 may comprise a smart safe console assembly 110 including a smart safe body 1 suitable to house at least one electronic device 21. The electronic device 21 may be able to be isolated from hand-held use by the smart safe body 1.

The smart safe console assembly 110 may also include an engager-button 2 configured for controlling input and output communications to and from the electronic device 21 (e.g., text messages) when a vehicle 45 hosting the smart safe console system 100 is in use. The smart safe console assembly 110 may be in communication with a provider and with the vehicle 45 and may be configured to control use of the electronic device 21 in relation to manipulation of the vehicle 45. The provider may provide cellular-phone-service (e.g., phone carriers), internet service (e.g., wireless communication network) to the electronic device 21. Those with ordinary skill in the art will now appreciate that upon reading this specification and by their understanding the art of communications with the electronic device 21 as described herein, methods of restraining, manipulating, providing, safely limiting will be understood by those knowledgeable in such art.

The vehicle 45 may host the smart safe console system 100 such that the smart safe console assembly 110 may be hardwired to the circuitry of the vehicle 45. The vehicle 45 may provide an energy source (e.g. vehicle battery) for powering the smart safe console system 100. Alternatively, the smart safe console assembly 110 may include a self-contained battery for powering the smart safe console system 100. The smart safe console system 100 may be powered by AC power distributed throughout the smart safe console assembly 110 by a DC power supply (e.g. vehicle battery). Other powering means may be used. Hardwired and non-hardwired versions may be employed.

The smart safe console assembly 110 may be in communication with sensors on the vehicle 45 with the sensors able to sense at least one condition of the vehicle 45. The at least one condition of the vehicle 45 may be measured via a proximity sensor, a motion sensor, a speed sensor, an audio sensor, an impact sensor, or combination thereof. The sensors may provide one or more functions for the smart safe console assembly 110 such as sending an automatically generated message from the electronic device 21 to a desired recipient when the impact sensor is sensed. The impact sensor may indicate that an accident to the vehicle 45 has occurred. The desired recipient can be a family member, friend, or third-party (i.e., police). Sensing means may vary.

The smart safe console system 100 may further comprise at least one cigarette socket 3 along an exterior-portion of the smart safe body 1 configured for communicating and powering one or more external electrical accessories with the smart safe console assembly 110.

Another aspect of the present invention may provide for a software application (SW App) that is hosted on the electronic device 21. The software application may be downloaded on the electronic device's 21 memory and be configured to register and facilitate communication between the electronic device 21 and the smart safe console assembly 110. The operator 40 may register to the software application by a phone number or other known identification means associated with the electronic device 21. The software application may be linked to the cellular-phone-service such that the phone number can be stored in a national database operated by the cellular-phone-service. The software application may be in communication with the vehicle 45 hosting the smart safe console system 100 such that one or more operations (e.g., unlocking the vehicle 45, rolling down windows, etc.) can be performed to the vehicle 45 from the software application. Further, the software application may allow for personalization of features equipped with the smart safe console assembly 110. In some embodiments, the smart safe console system 100 communicates specific commands to the SW App when the safe is opened, such as a command to remind the user to update the SW App and allows the signals containing the update material to communicate with the electronic device 21 while the electronic device 21 is secured within the smart safe console assembly 110. In some embodiment, updating occurs when the electronic device 21 is charging in the smart safe console assembly 110. In other embodiments, updating can occur in the smart safe console assembly 110 when the electronic device 21 is not charging.

According to one embodiment, the smart safe console system 100 may be arranged as a kit 105. In particular, the smart safe console system 100 may further include a set of instructions 107. The instructions 107 may detail functional relationships in relation to the structure of the smart safe console system 100 such that the smart safe console system 100 can be used, maintained, or the like, in a preferred manner.

Figure 2:
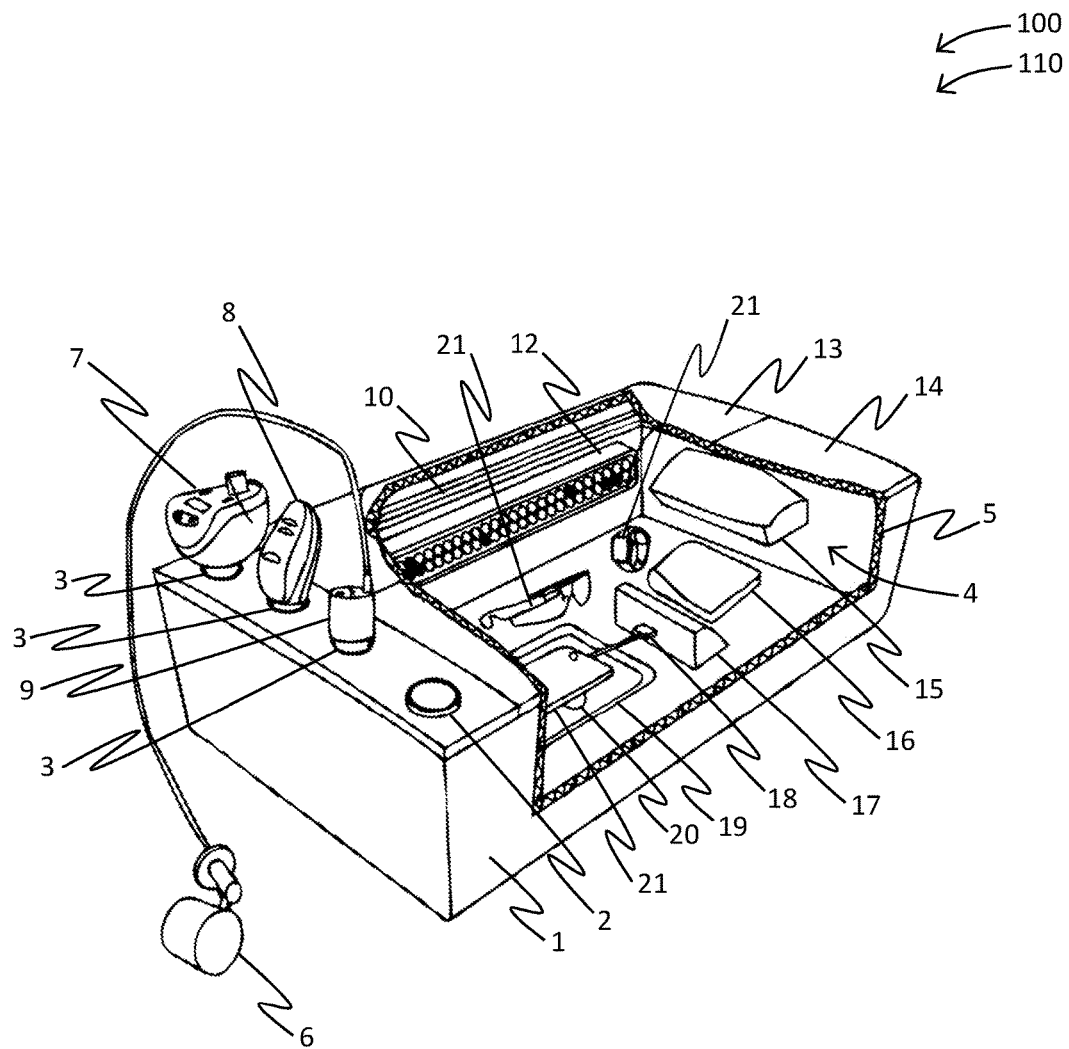
FIG. 2 is a perspective cutaway view of the smart safe console system of FIG. 1, according to an embodiment of the present disclosure.

FIG. 2 shows the smart safe console system 100 of FIG. 1, according to an embodiment of the present disclosure. As above, the smart safe console system 100 may include the smart safe console assembly 110 including the smart safe body 1 suitable to house the at least one electronic device 21. The electronic device 21 may be able to be isolated from hand-held use by the smart safe body 1.

The smart safe console assembly 110 may also include the engager-button 2 configured for controlling input and output communications to and from the electronic device 21 when the vehicle 45 hosting the smart safe console system 100 is in use. The smart safe console assembly 110 may be in communication with the provider and with the vehicle 45 and may be configured to control use of the electronic device 21 in relation to manipulation of the vehicle 45. The provider may provide cellular-phone-service, internet service to the electronic device 21. The input and output communications may include sending text or voice recorded messages.

The smart safe console assembly 110 may further comprise at least one cigarette socket 3 along the exterior-portion of the smart safe body 1 configured for communicating and powering one or more external electrical accessories with the smart safe console assembly 110. The external electrical accessories include a transmitter 7, a virtual assistant device 9, a fragrance emitter 8, or combination thereof. The at least one cigarette socket 3 may communicably connect to the smart safe console assembly 110 such that the external electrical accessories are in communication with the provider and with the vehicle 45. Each of the external electrical accessories may be connected (with an adapter) or otherwise equipped with a rearward protruding electrode for contacting a powered electrical contact within the cigarette socket 3.

The smart safe body 1 further includes a left-wing 13 and a right-wing 14 configured to move between an opened-state and a closed-state. When in the opened-state, the electronic device 21 may be inserted or removed from the smart safe body 1. When in the closed-state, the electronic device 21 may be isolated from hand-held use. The left-wing 13 and the right-wing 14 may include a liner 5. Furthermore, the liner 5 may extend around the entire smart safe body 1. The liner 5 comprises of a sound-proofing material and is configured to dampen and inhibit sounds from the electronic device 21 from reaching the operator 40 of the vehicle 45. Sounds generated from the electronic device 21 may distract the operator 40 unless otherwise dampened.

The smart safe body 1 may include an interior-housing 4 defined by one or more walls, the left-wing 13, and the right-wing 14. The smart safe body 1 can be provided in a variety of shapes and sizes that fit in the vehicle 45. For example, the smart safe body 1 may include a curved surface on one or more walls or be substantially rectangular/squared. The interior-housing 4 may be equipped with an ultraviolet light disinfecting device 12 configured to destroy bacteria on one or more surfaces housed within the smart safe body 1. The interior-housing 4 may further be equipped with a sunglasses holder 15, a wallet holder 16, a charging unit 17, a docking station 19, an electromagnetic field (EMF) battery 20, colored LED light strips 10, or combination thereof. The colored LED light strips 10 may be customized (i.e., changing of light colors) via the SW App. Additionally, other features may be equipped in the interior-housing not shown in FIG. 2, such as a cooling fan, when desired.

Figure 3:
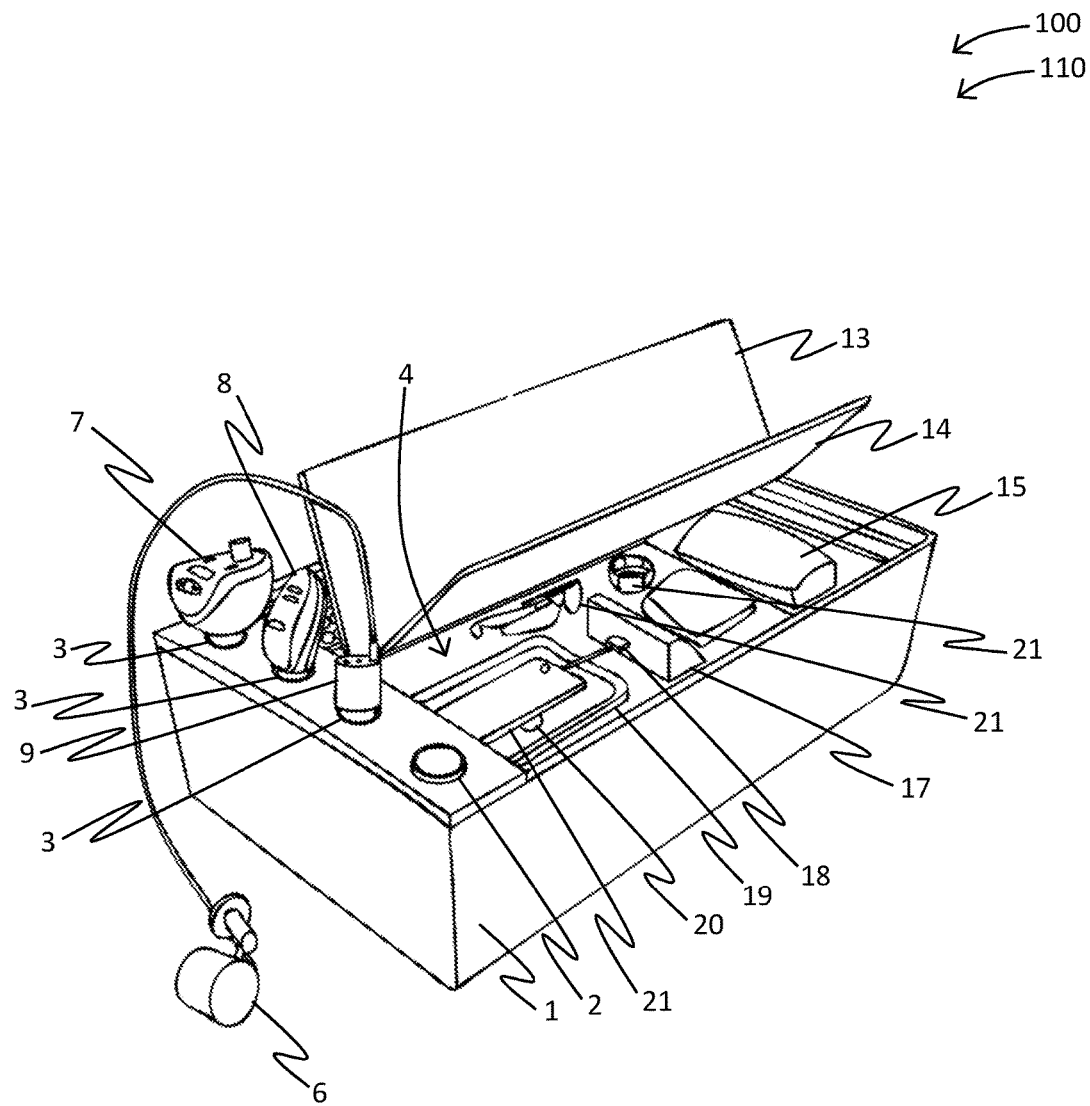
FIG. 3 is a perspective view of the smart safe console system of FIG. 1, according to an embodiment of the present disclosure.

FIG. 3 is a perspective view of the smart safe console system 100 of FIG. 1, according to an embodiment of the present disclosure. As noted above, the smart safe body 1 includes the left-wing 13 and the right-wing 14 configured to move between the opened-state and the closed-state. When in the opened-state, the electronic device 21 may be inserted or removed from the smart safe body 1. When in the closed-state, the electronic device 21 may be isolated from hand-held use. The left-wing 13 and the right-wing 14 may open on opposite sides (as shown) or they may open on the same side.

The smart safe body 1 may further include the interior-housing 4 defined by one or more walls, the left-wing 13, and the right-wing 14. The interior-housing 4 may be equipped with the charging unit 17 including an electrical connector 18 (e.g., USB socket and/or plug) for connecting the electronic device 21 to be charged, and the docking station 19 for holding the electronic device 21 proximate the charging unit 17 and the electrical connector 18. The interior-housing 4 may further be equipped with the electromagnetic field (EMF) battery 20 positioned below the docking station 19 and is configured prevent radiation from emitting from the electronic device 21 when housed within the smart safe body 1.

The smart safe assembly 110 may be in communication with a control module configured to permit non-operation of the vehicle 45 when the electronic device 21 is not in a sensed-condition, and operation of the vehicle 45 when the electronic device 21 is in the sensed-condition. The sensed-condition may be when the electronic device 21 is electrically connected to the charging unit 17, and the left-wing 13 and the right-wing 14 is in the closed-state. The charging unit 17, and the left-wing 13 and the right-wing 14 may include at least one operation sensor coupled to the control module. The at least one operation sensor may be configured to detect the sensed-condition and send to the control module upon receipt of the sensed-condition. It should be noted that the electronic device 21 may be required to be registered with the software application prior to receipt of the sensed-condition such that all electronic devices 21 can be accounted for.

Figure 4:
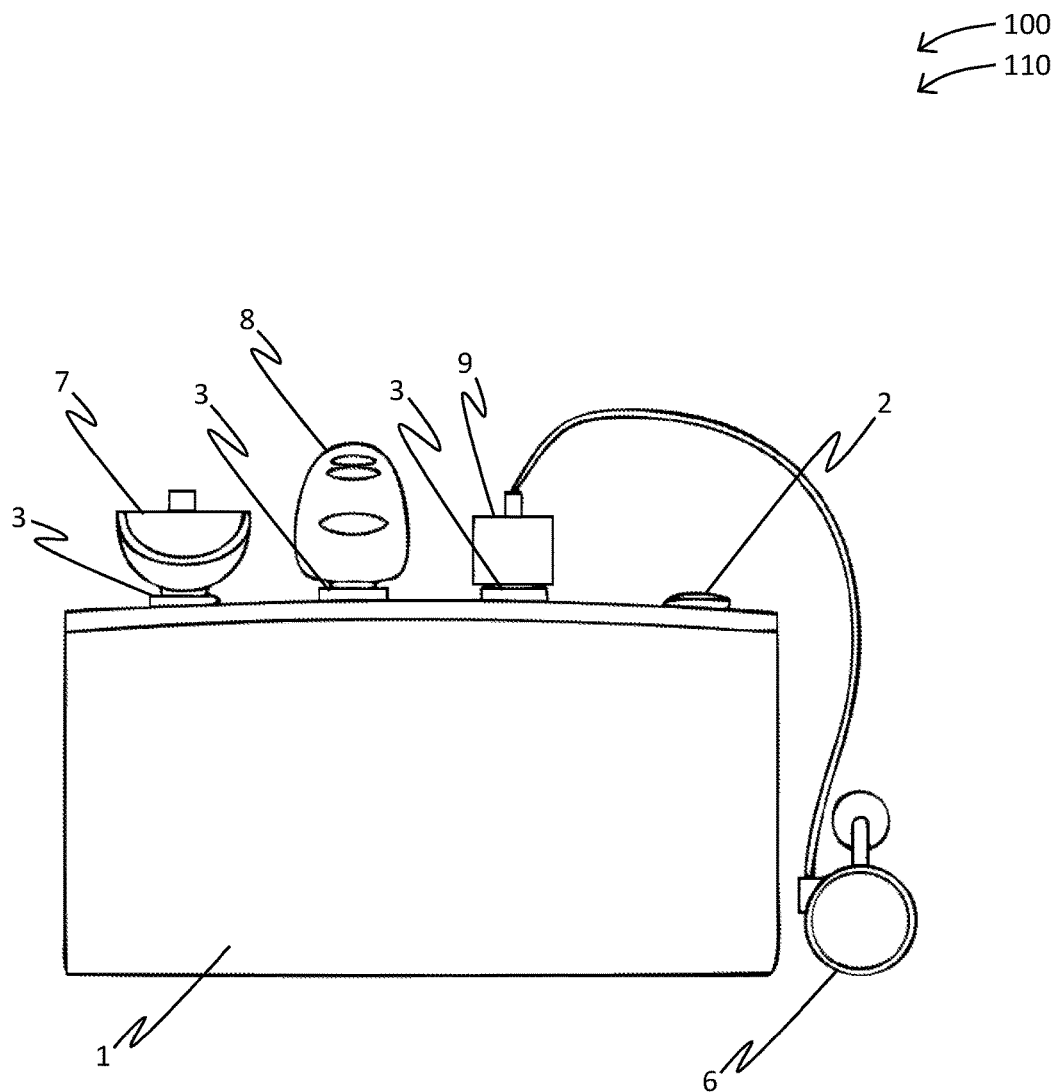
FIG. 4 is a front view of the smart safe console system of FIG. 1, according to an embodiment of the present disclosure.

FIG. 4 is a front view of the smart safe console system 100 of FIG. 1, according to an embodiment of the present disclosure. The smart safe console assembly 110 may comprise the at least one cigarette socket 3 along the exterior-portion of the smart safe body 1 configured for communicating and powering the one or more external electrical accessories with the smart safe console assembly 110. The external electrical accessories may include the transmitter 7, the virtual assistant device 9, and the fragrance emitter 8. The fragrance emitter 8 may be configured to emit one or more scents within the vehicle 45. The fragrance emitter 8 may continually emit scents or periodically on a timer. Other features may be included.

The virtual assistant device 9 may be in communication with the electronic device 21 (hosting the software application) and the engager-button 2 and is configured to enable voice input communication and voice output communication between the virtual assistant device 9 and the electronic device 21 when a signal is received from the engager-button 2. Commonly known virtual assistant devices 9 include AMAZON ECHO, ALEXA, and GOOGLE ASSISTANT all of which may be pre-equipped with one or more speaker(s) and microphone(s) to enable the voice input communication and the voice output communication. The voice input communication and the voice output communication may include asking and receiving information ranging from the weather report to any encyclopedia question. Further, the operator 40 may personalize the voice input communication and the voice output communication via the virtual assistant device 9 to provide voices to be male, female, celebrity, and the like. The virtual assistant device 9 may include a cord and a suction cup 6 such that the virtual assistant device 9 can be fastened to the windshield of the vehicle 45.

The virtual assistant device 9 may be in communication with a navigational system (e.g., GARMIN technology) hosted in the vehicle 45 and/or with the electronic device 21. This way the electronic device 21 can remain in the smart safe body 1 while the operator 40 uses this technology for navigation. The operator 40 of the vehicle 45 can engage the engager-button 2 to provide voice input communication. The voice input communication may provide one or more services to the operator 40 such as but not limited to voice recorded messages processed on the virtual assistant device 9 to send to the desired recipient via the cellular-phone-service (e.g., notifying the desired recipient when the operator 40 is unable to respond due to driving and/or approximate times when the operator 40 will be free to respond based on communications received by the navigational system), purchasing of one or more items via the internet service, requesting a list of songs played on the radio, inputting personal information associated with the operator 40 to be stored on the electronic device 21, requesting specific responses based on the inputted personal information (i.e. bank account information), etc. The voice output communication may provide one or more services to the operator 40 such as reminders from the calendar on the electronic device 21, reminders for ongoing conversations on the electronic device 21, automatic updates for the electronic device 21, responses to the voice input communication, and the like.

The transmitter 7 may be configured to communicate with a controller and a processor. The software application may be programmed to include a switch that enables communication between the transmitter 7 and the controller and the processor. The switch may be manually activated via interfacing with the software application or activated once the navigational system equipped on the vehicle 45 receives a signal that the desired destination (e.g., home) is less than a predetermined distance away. The controller and the processor may be communicably coupled to one or more features within the desired destination such that the one or more features can be turned on/off. The one or more features may include but not be limited to an alarm system, temperature settings, propane fireplace, lighting, sound system, such as a stereo, and powered kitchen accessories. Those with ordinary skill in the art will now appreciate that upon reading this specification and by their understanding the art of transmitters as described herein, methods of communication with powered objects via the transmitter 7 will be understood by those knowledgeable in such art.

Figure 5:
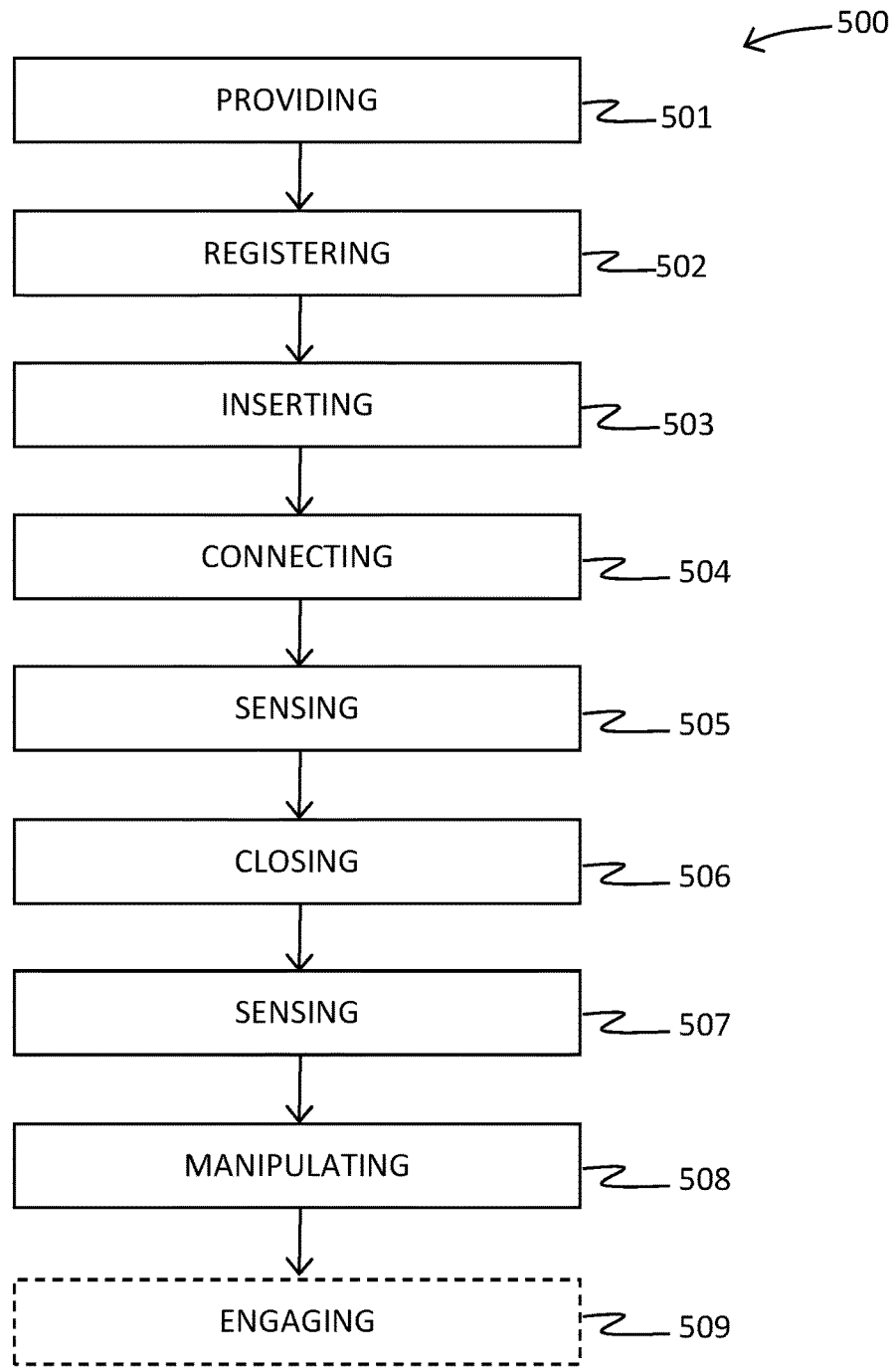
FIG. 5 is a flow diagram illustrating a method of using a smart safe console system, according to an embodiment of the present disclosure.

FIG. 5 is a flow diagram illustrating a method for using a smart safe console system 500, according to an embodiment of the present disclosure. In particular, the method for using the smart safe console system 500 may include one or more components or features of the smart safe console system 100 as described above. As illustrated, the method for using the smart safe console system 500 may include the steps of: step one 501, providing a smart safe console assembly 110 including a smart safe body 1 suitable to house at least one electronic device 21, an engager-button 2 configured for controlling input and output communications to and from the electronic device 21 when a vehicle 45 hosting the smart safe console system 100 is in use; the smart safe body 1 further includes a left-wing 13 and a right-wing 14 configured to move between an opened-state and a closed-state, and an interior-housing 4 defined by one or more walls, the left-wing 13, and the right-wing 14; the smart safe console assembly 110 may be in communication with a provider and with the vehicle 45 and may be configured to control use of the electronic device 21 in relation to manipulation of the vehicle 45; step two 502, registering the electronic device 21 with a software application in communication with the smart safe assembly 110; step three 503, inserting the electronic device 21 into the smart safe body 1; step four 504, connecting the electronic device 21 to a charging unit 17 equipped in the interior-housing 4; step five 505, sensing the electronic device 21 is connected to the charging unit 17 via at least one operation sensor and registered with the software application; step six 506, closing the left-wing 13 and the right-wing 14; step seven 507, sensing the left-wing 13 and the right-wing 14 are in the closed-state via the at least one operation sensor; step eight 508, manipulating the vehicle 45 (e.g., turning the vehicle 45 on); and step nine 509, engaging the engager-button 2 for controlling the input and the output communications to and from the electronic device 21.

It should be noted that step nine 509 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using the smart safe console system 100 (NOTE: e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A smart safe console system, the system comprising:
  a smart safe console assembly including
    a smart safe body suitable to house at least one electronic device, said electronic device able to be isolated from hand-held use by said smart safe body, and
    an engager-button configured for controlling input and output communications to and from said electronic device when a vehicle hosting said smart safe console system is in use;
  wherein said smart safe console assembly is in communication with a provider and with said vehicle;
  wherein said smart safe console assembly is configured to control use of said electronic device in relation to manipulation of said vehicle;
  wherein said provider provides cellular-phone-service, internet service to said electronic device;
  wherein said smart safe console assembly is in communication with sensors on said vehicle, said sensors able to sense at least one condition of said vehicle;
  wherein said at least one condition of said vehicle is measured via a proximity sensor, a motion sensor, a speed sensor, an audio sensor, and an impact sensor;

wherein at least one cigarette socket is along an exterior-portion of said smart safe body configured for communicating and powering one or more external electrical accessories with said smart safe console assembly;

wherein said external electrical accessories includes a transmitter, said transmitter is configured to communicate with a controller and a processor;

wherein said external electrical accessories includes a virtual assistant device;

wherein said virtual assistant device is in communication with said electronic device and said engager-button and is configured to enable voice input communication and voice output communication between said virtual assistant device and said electronic device when a signal is received from said engager-button;

wherein said external electrical accessories includes a fragrance emitter and is configured to emit one or more scents within said vehicle;

wherein a software application is hosted on said electronic device, said software application configured to register and facilitate communication between said electronic device and said smart safe assembly;

wherein said smart safe body includes a left-wing and a right-wing configured to move between an opened-state and a closed-state, when in said opened-state, said electronic device is inserted or removed from the smart safe body, and when in said closed-state, said electronic device is isolated from hand-held use;

wherein said left-wing and said right-wing includes a liner, said liner comprises of a sound-proofing material and is configured to dampen and inhibit sounds from said electronic device from reaching an operator of said vehicle;

wherein said smart safe body includes an interior-housing, said interior-housing is defined by one or more walls, said left-wing, and said right-wing;

wherein said interior-housing is equipped with an ultra-violet light disinfecting device and is configured to destroy bacteria on one or more surfaces housed within said smart safe body;

wherein said interior-housing is equipped with a charging unit including an electrical connector for connecting said electronic device to be charged, and a docking station for holding said electronic device proximate said charging unit and said electrical connector;

wherein said interior-housing is further equipped with an electromagnetic field (EMF) battery positioned below said docking station and is configured prevent radiation from emitting from said electronic device when housed within said smart safe body;

wherein said smart safe assembly is in communication with a control module configured to permit non-operation of said vehicle when said electronic device is not in a sensed-condition, and operation of the said vehicle when said electronic device is in said sensed-condition;

wherein said sensed-condition is when said electronic device is electrically connected to said charging unit, and said left-wing and said right-wing is in said closed-state; and wherein said charging unit and said left-wing and said right-wing include at least one operation sensor coupled to said control module, said at least one operation sensor is configured to detect said sensed-condition and send to said control module upon receipt of said sensed-condition.

2. The smart safe console system of claim 1, further comprising set of instructions; and wherein the smart safe console assembly is arranged as a kit.

3. A method of using a smart safe console system, the method comprising the steps of:
providing the smart safe console assembly of claim 1
registering said electronic device with a software application in communication with said smart safe assembly,
inserting said electronic device into said smart safe body,
connecting said electronic device to a charging unit equipped in said interior-housing,
sensing said electronic device is connected to said charging unit via at least one operation sensor and registered with said software application,
closing said left-wing and said right-wing,
sensing said left-wing and said right-wing are in said closed-state via said at least one operation sensor, and
manipulating said vehicle.

4. The method of claim 3, further comprising the steps of engaging said engager-button for controlling said input and said output communications to and from said electronic device.

* * * * *